Patented Mar. 24, 1953

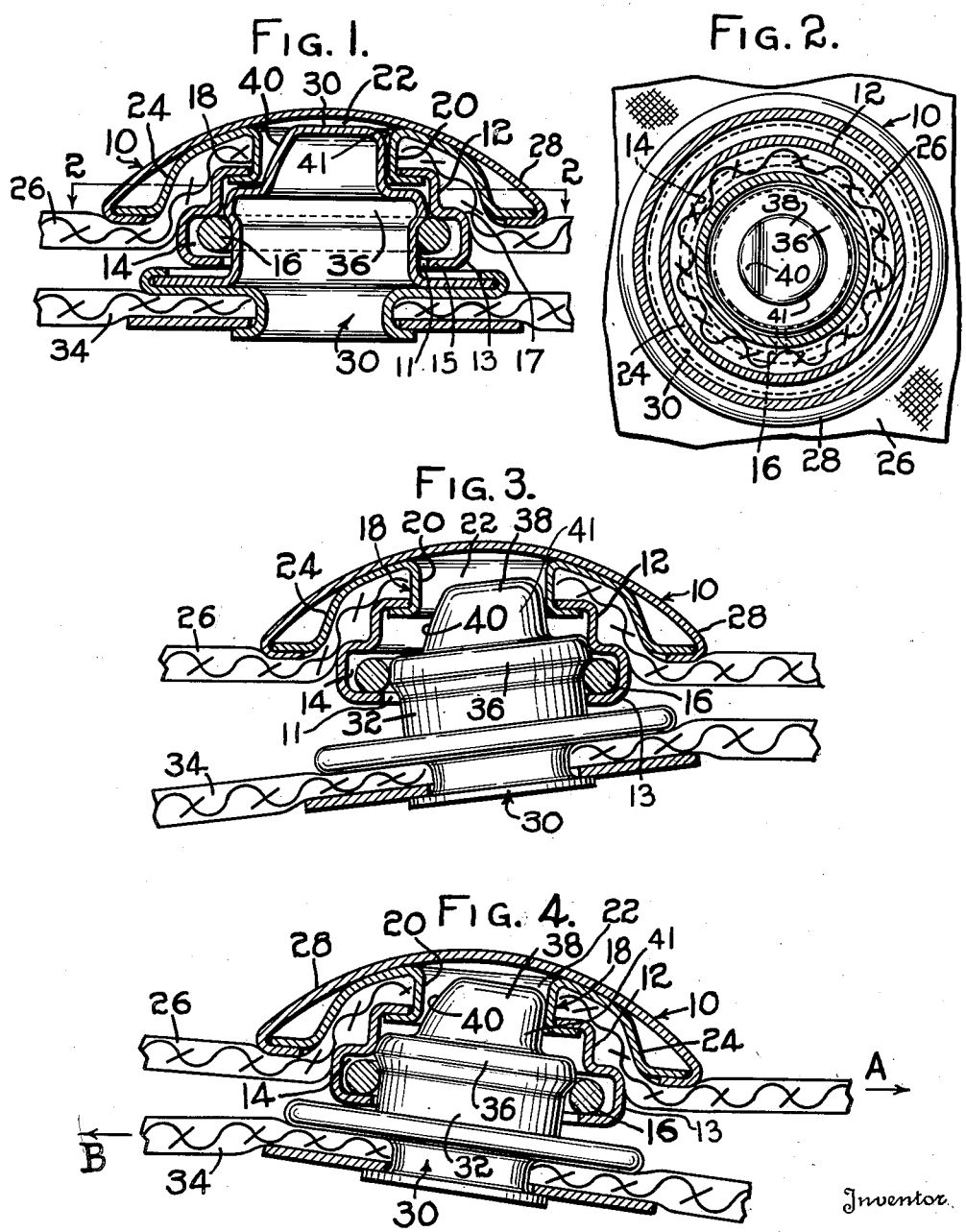

2,632,222

UNITED STATES PATENT OFFICE 2,632,222

THREE SIDE LOCK SNAP FASTENER

Philip D. Becker, Hingham, Mass., assignor to United-Carr Fastener Corporation, Cambridge, Mass., a corporation of Massachusetts Application December 30, 1948, Serial No. 68,188

2 Claims. (Cl. 24—218)

This invention relates to snap fasteners, and has particular reference to a three-side lock snap fastener assembly which may be readily applied to a supporting sheet by an automatic attaching machine.

The principal object of this invention is to provide an improved three-side lock snap fastener in which cooperating stud and socket members may be disengaged only by a separating force which tends to tilt the stud in a predetermined direction in relation to the socket.

A further object of the invention is to provide a three-side lock snap fastener so constructed that the socket may be readily applied to a supporting sheet by an automatic attaching machine without special orientation while the stud may or may not be specially oriented.

A further object of the invention is to provide a three-side lock snap fastener comprising a stud and socket assembly which is adapted to be attached to supporting sheets in such a manner that a shearing pull applied to the stud and socket by the supporting sheets tends to tilt the socket against the direction of the tilt of the stud.

Other objects of the invention will, in part, be obvious and will, in part, appear hereinafter.

For a fuller understanding of the nature and objects of the invention, reference should be had to the following detailed description, taken in conjunction with the accompanying drawing, in which Fig. 1 is a view in elevation, partly in section, of a socket and stud assembly embodying the features of the invention;

Fig. 2 is a view in section on line 2—2 of Fig. 1;

Fig. 3 is a view in elevation, partly in section, of the assembly of Fig. 1, showing the effect of a disengaging force so applied as to tilt the stud in the socket toward the beveled portion of the stud; and Fig. 4 is a view in elevation, partly in section, of the assembly of Fig. 1, showing the effect of shearing force applied to the assembly by the supporting sheet.

Referring to the drawing, there is illustrated the improved snap fastener assembly of the invention, which comprises a socket 10 and a cooperating stud 30. The socket 10 comprises a body 12 having a channel-shaped peripheral wall 13 at the lower end thereof, adjacent a stud-admitting opening 11, which defines a circumferential recess 14 adapted to receive and retain a split ring spring member 16. Axially spaced opposing portions 15 and 17 of wall 13 confine the spring member against substantial axial tilting movement. Attached to the body 12 is a base member 18, which comprises a further peripheral wall 20 of uniform circular shape forming a cavity 22 located axially rearwardly of recess 14, and a flange 24 extending outwardly and downwardly from wall 20, in such relation to the exterior of the body 12 as to receive a supporting sheet 26 therebetween. To cover the cavity 22, and to impart rigidity to the socket assembly a cap 28 is attached to flange 24 of the base member.

The stud member 30 comprises a shank 32 which may be attached to a supporting sheet 34 in the usual manner, as by riveting. An enlarged portion 36 is disposed about the shank for engagement by the spring member 16 when the stud is inserted into the socket.

A locking post 38 is disposed on the shank for projecting into the cavity 22 when the stud is in assembled position in the socket. The stud 30 is provided with an unlocking side 40, which side is determined by the shape of the post 38 and its position relative to the rest of the stud. The post must be so disposed on the stud as to have a side on which no portion of the post extends beyond an arc tangent to the inner edge of the wall 20, the arc having as a center the point on the enlarged portion on the opposite side of the stud which bears against the socket body when a tilting force is applied to the socket or the stud. Other sides of the post must extend beyond such an arc to provide sides on which unlocking cannot occur.

The unlocking side may be provided in a number of ways. One side of the post may be beveled as shown or rounded to conform with the above requirements, or the post may be slightly off center in relation to the stud.

To assemble the device, the stud is snapped into the socket in the conventional manner, and the spring 16 expands over the enlarged portion of the stud to retain the stud in the socket, and the post 38 enters the cavity 22.

The size of the opening 22 is in such relation to the size of the post 38 that the peripheral wall 20 surrounds the post to prevent tilting of the stud relative to the socket except in the direction of the unlocking side of the stud, as hereinbefore described. As shown, such sides comprise a main side wall area 41 of uniform circular shape extending around the major part of the circumference of post 38 and so closely embraced by wall 20 as to be adapted to prevent tilting of the stud out of the socket.

The effect of a tilting motion in the direction of the beveled portion to disengage the stud from the socket is best illustrated in Fig. 3. The tilting of the stud or socket in response to a disengaging force applied to either on the unlocking side of the stud causes the stud or socket to pivot about the enlarged portion of the stud bearing against a point on spring 16 on the opposite side. As the stud or socket tilts, the spring 16 expands over the enlarged portion 36, and the post 38 passes through the opening 22, allowing the stud to become disengaged from the socket.

The effect of a disengaging force applied to the stud and the socket at some point other than on the unlocking side tends to tilt the stud or the socket about the enlarged portion of the stud bearing on the body of the socket on the opposite side. However, in this case some portion of the main side wall area 41 of the post 38 engages the wall 20, which prevents the stud from tilting far enough to force the spring over the enlarged portion of the stud, thereby preventing the stud from becoming disengaged from the socket.

In some cases it may be desired to apply the stud and socket to the supporting material by means of automatic machines. In such operations, it is necessary that the unlocking side of the stud and the socket assembly be in a predetermined position in relation to the sheet. To avoid complicated positioning mechanisms, a beveled portion may be placed on the stud by the attaching machine, and the unlocking side of the assembly will be determined by the position of the beveled side of the stud. In this manner a symmetrical stud may enter the attaching machine in any position relative to the supporting sheet, and the attaching machine will bevel the stud on the proper side. If, however, the bevel or other unlocking means is placed on the stud in advance of attaching, then the machine must orient the stud to the proper position.

The flange 24 of the base member 18 is so disposed about the body 12 as to receive the supporting sheet 26 therebetween. The flange 24 extends downwardly from the wall 20 confining the supporting sheet closely about the body 12. It will be seen that a shearing force applied to the stud and socket by the supporting sheets will tend to pivot or tilt the stud in the socket about the enlarged portion of the stud which bears against the body of the socket. Therefore, the supporting sheet should be depressed downwardly by the flange to a point below the point of pivot of the stud in the socket. As illustrated in Fig. 4, if a shearing force is applied, as indicated at A and B, to the stud 30 and socket member 10 by the supporting sheets, the force applied at A tends to cause the supporting sheet 26 to lift the nearest edge of the base member 18 of the socket, tending to tilt the upper portion of the socket away from the direction of the applied force, or counter-clockwise. The opposing force applied at B tends to tilt the stud against the direction of tilt of the socket, or clockwise, thereby forcing some part of side wall area 41 of the stud post 38 against the wall 20 of the cavity, thereby locking the stud in the socket. In this way the stud is prevented from tilting out of the socket in response to a shearing force in any direction except one, a shearing force tending to tilt the socket and the stud post away from each other on the unlocking side of the stud.

Since certain obvious changes may be made without departing from the scope of the invention, it is intended that all matter contained in the foregoing description be interpreted in an illustrative and not in a limiting sense.

I claim:

1. A three-side lock snap fastener comprising a socket member having a stud-receiving cavity and having a stud-admitting opening at its lower face, a peripheral wall on the socket member defining a retaining recess adjacent said stud-admitting opening, an expansible spring ring member in said recess, said peripheral wall having parallel axially spaced portions confining said spring ring member against axial tilting movement in said recess, a further peripheral wall on the socket member of uniform circular shape located axially rearwardly of said recess, a stud member in removable assembly with the socket member having a shank, an enlarged portion at the outer end of said shank cooperative with said spring ring member to detachably retain the stud member in the socket member and also having a locking post surrounded by said further peripheral wall of the socket member, the locking post having a main side wall area closely embraced by said further peripheral wall around the major part of its circumference adapted to prevent tilting of the stud member out of the socket member, and an unlocking side wall on a side of said locking post sufficiently spaced from said further peripheral wall as to clear the same and enable the stud member to be removed from the socket member when the socket member is tilted about a point on said enlarged portion of the stud member circumferentially opposite said unlocking side.

2. A three-side lock snap fastener comprising a socket member having a stud-receiving cavity and having a stud-admitting opening at its lower face, a peripheral wall on the socket member defining a retaining recess adjacent said stud-admitting opening, an expansible spring ring member in said recess, said peripheral wall having parallel axially spaced portions confining said spring ring member against axial tilting movement in said recess, a further peripheral wall on the socket member of uniform circular shape located axially rearwardly of said recess, a stud member in removable assembly with the socket member having a shank, an enlarged portion at the outer end of said shank cooperative with said spring ring member to detachably retain the stud member in the socket member and also having a locking post surrounded by said further peripheral wall of the socket member, the locking post having a main side wall area of uniform circular shape extending around the major part of its circumference and closely embraced by said further peripheral wall adapted to prevent tilting of the stud member out of the socket member, and a beveled locking wall on one side of said locking post adapted to clear said further peripheral wall and enable the stud member to be removed from the socket member when the socket member is tilted about a point on said enlarged portion of the stud member circumferentially opposite said unlocking side.

PHILIP D. BECKER.

REFERENCES CITED

The following references are of record in the file of this patent:

UNITED STATES PATENTS

| Number | Name | Date |
|---|---|---|
| 613,299 | Paul | Nov. 1, 1898 |
| 2,328,016 | Huelster | Aug. 31, 1943 |
| 2,467,315 | Jones | Apr. 12, 1949 |